Sept. 2, 1952     A. H. HABERSTUMP     2,609,029
SEAT TRACK OF THE VERTICAL ADJUSTABLE
TYPE FOR AUTOMOTIVE VEHICLES
Filed July 29, 1950     5 Sheets-Sheet 4
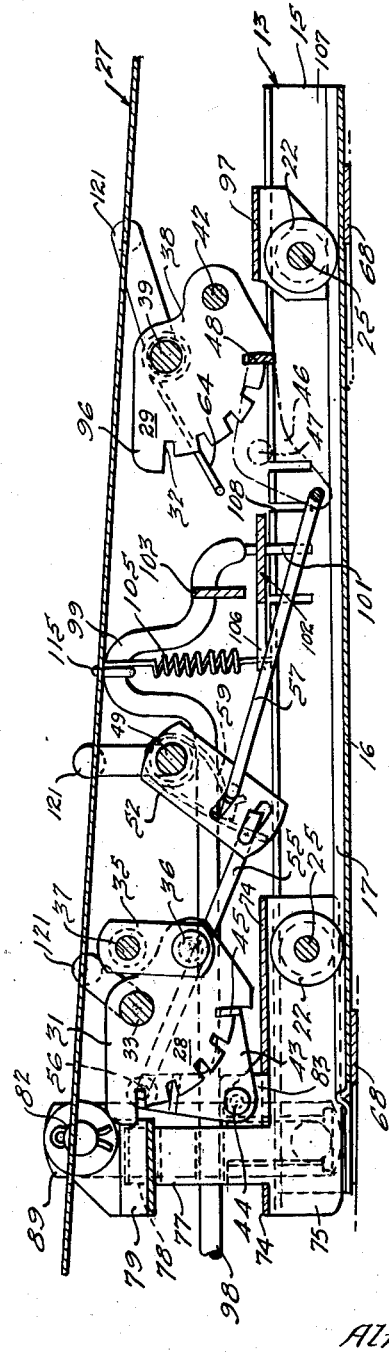
INVENTOR.
Alfred H. Haberstump.
BY
Harness, Dickey & Pierce.
ATTORNEYS.

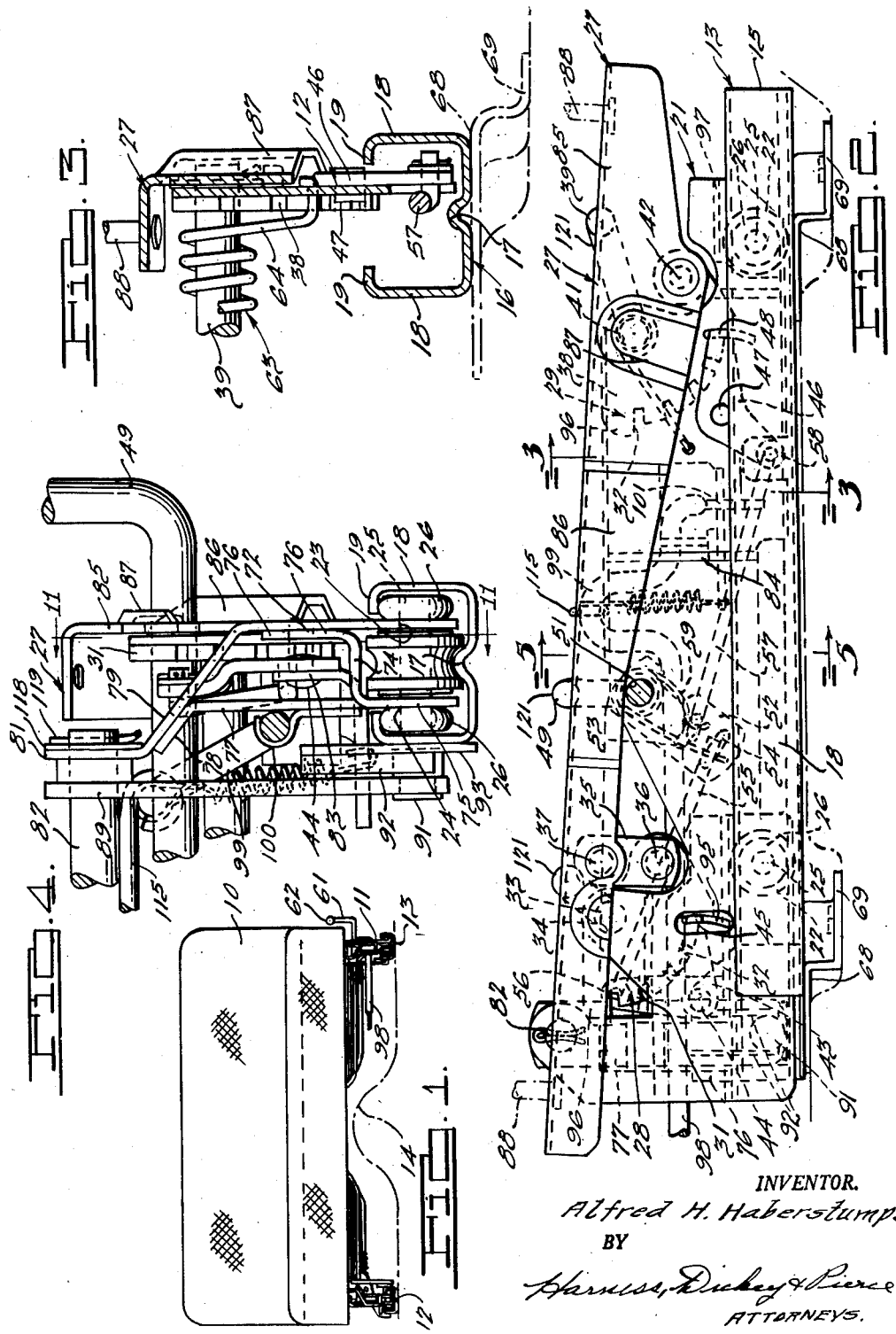

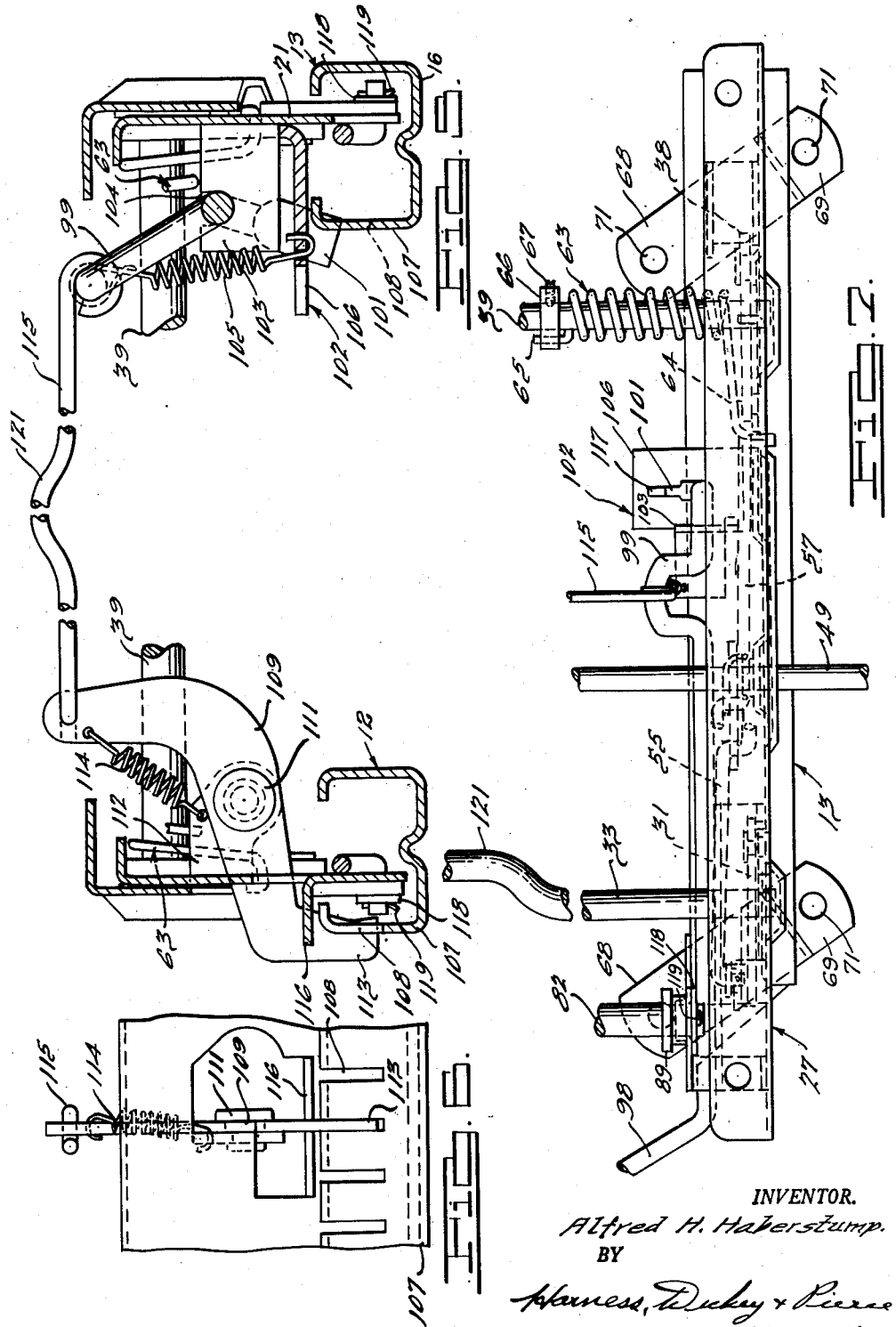

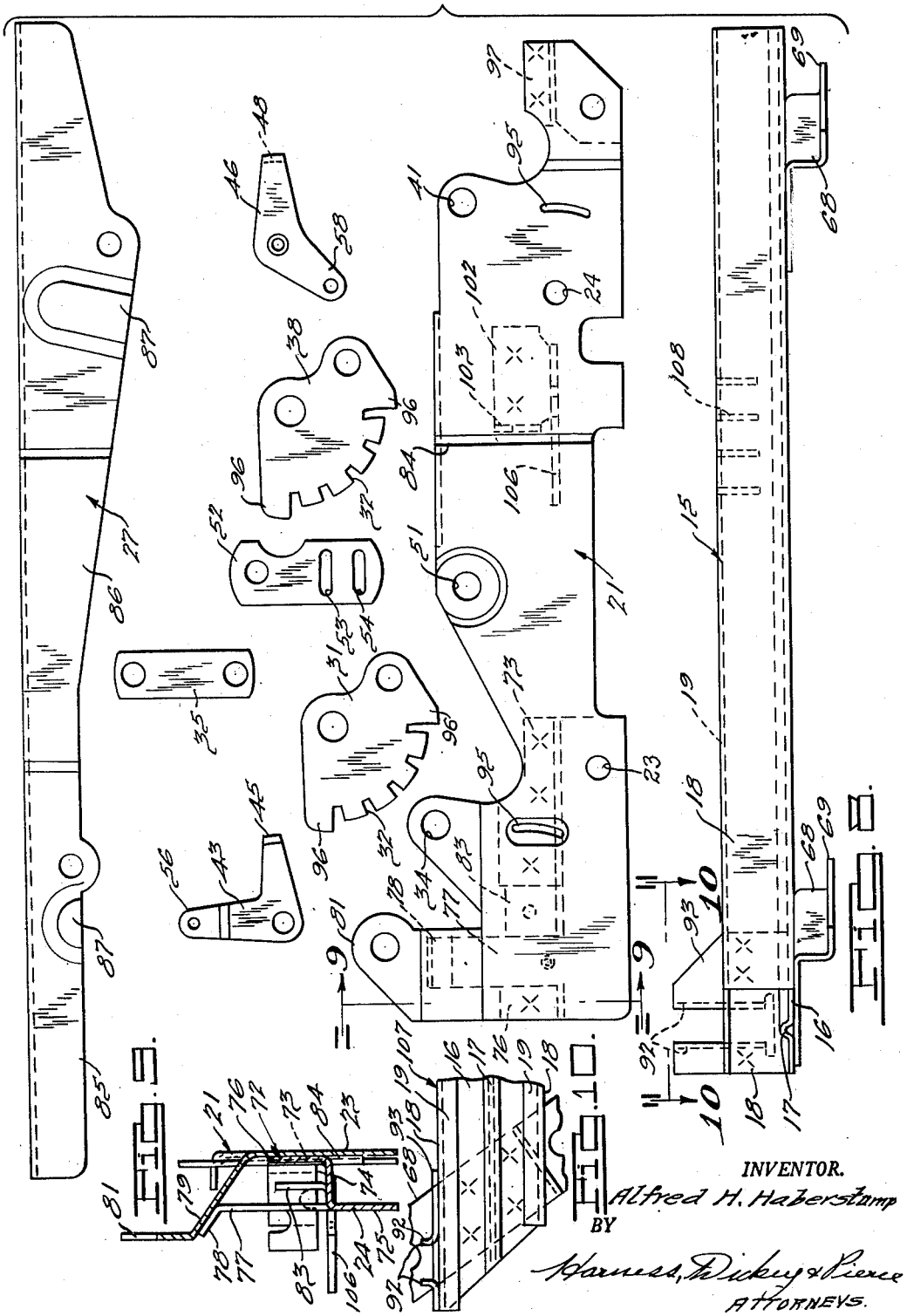

Patented Sept. 2, 1952

2,609,029

UNITED STATES PATENT OFFICE 2,609,029

SEAT TRACK OF THE VERTICAL ADJUSTABLE TYPE FOR AUTOMOTIVE VEHICLES

Alfred H. Haberstump, Detroit, Mich., assignor to American Metal Products Company, Detroit, Mich., a corporation of Michigan Application July 29, 1950, Serial No. 176,583

15 Claims. (Cl. 155—14)

1

This invention relates to tracks for seats, and particularly to a seat track by which the seat may be adjusted forwardly and rearwardly and in elevation at the forward or rear end independently of the other end and of the horizontal adjustment.

It has been the practice in the past to provide a base support and a seat support interconnected by ball bearings or links to permit the seat support to be adjusted forwardly and rearwardly relative to the base support. Various arrangements were made to have the seat support move vertically as it is adjusted horizontally, but, insofar as is known to applicant no commercially successful track has been provided whereby a vertical adjustment may be applied to the seat independently of the longitudinal adjustment and independently at the forward and rearward ends thereof.

The present invention pertains to right and left-hand seat track elements of similar construction, each of which comprises a base and intermediate support which are interconnected by means which permit the intermediate support to be moved longitudinally of the base support. The intermediate support is pivoted to a seat support disposed thereabove in a manner that either the front or the rear end of the seat support may be elevated or lowered independently of the other end. A latching mechanism is provided for securing the intermediate support in predetermined adjusted position relative to the base support and a second set of independent latching mechanisms locks the mechanism at the forward and rearward adjusted portions. Preferably the mechanism is so constructed that when the operating lever therefor is moved forwardly, the front portion of the seat support may be adjusted upwardly or downwardly, and when the same operating handle is moved rearwardly, the rear portion of the seat support may be independently adjusted upwardly or downwardly.

Accordingly, the main objects of the invention are: to provide a seat track for a seat by which the seat may be adjusted forwardly and rearwardly and adjusted in elevation at the forward or rearward edge independently of the other edge and of the forward and rearward adjustment thereof; to provide an adjustable seat support for a seat embodying a pair of supporting mechanisms, one of the right and the other of the left-hand type which are similar to each other except for the opposite hand and minor differences which embody a base support and inter-

2 mediate support movable longitudinally thereof and a seat support carried by the intermediate support for vertical adjustment at the forward and rear end; to provide a seat support with track elements which are similar but of opposite hand and which embody an assembly which is adjusted longitudinally, which assembly carriers a seat support which is adjusted vertically at the opposite ends independently of each other and which are interconnected laterally by torsion means which produces the adjustments in unison and secured in adjusted position by latching mechanisms which are interconnected across the space between the track elements for operation in unison, and, in general, to provide an adjustable support for a seat which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a front view in elevation of a seat mounted on track elements embodying features of the present invention;

Fig. 2 is an enlarged side view in elevation of the right-hand track element illustrated in Fig. 1;

Fig. 3 is an enlarged sectional view of the structure illustrated in Fig. 2, taken on the line 3—3 thereof;

Fig. 4 is a front view of the track element illustrated in Fig. 2, as viewed from the left-hand end thereof;

Fig. 5 is an enlarged sectional view of the structure illustrated in Fig. 2, taken on the line 5—5 thereof;

Fig. 6 is a side view of the structure illustrated in Fig. 5, as viewed from the left-hand side thereof;

Fig. 7 is a plan view of the structure illustrated in Fig. 2;

Fig. 8 is an exploded view of the elements of the left-hand seat track embodying the present invention;

Fig. 9 is a sectional view of the intermediate track element of Fig. 8, taken on the line 9—9 thereof;

Fig. 10 is a broken view of the end of the base track element of Fig. 9, as viewed from line 10—10 thereof;

Fig. 11 is a sectional view of the structure illustrated in Fig. 4, taken on the line 11—11 thereof.

Figure 12:
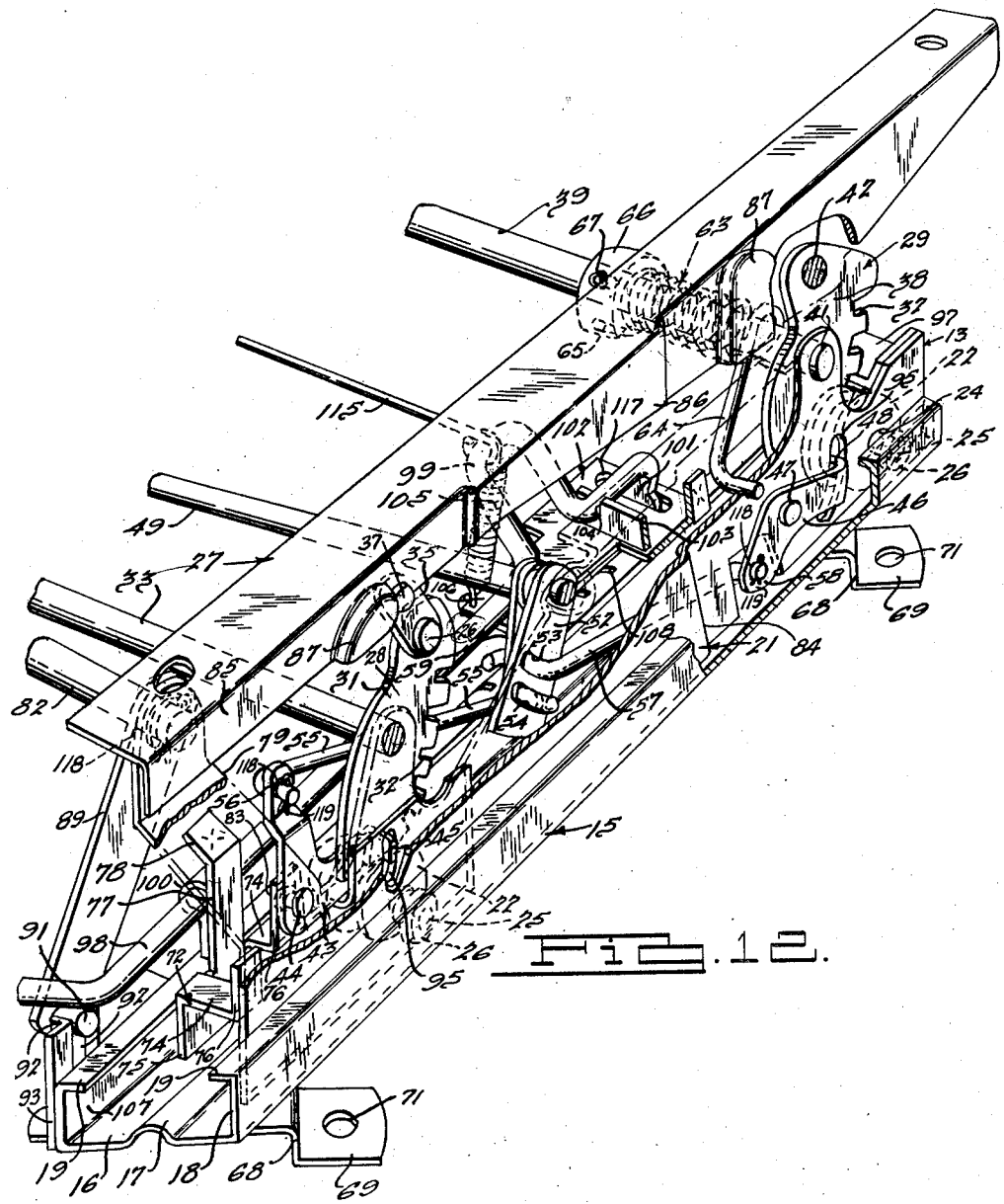
Fig. 12 is a perspective view, with parts broken away, of the structure illustrated in Fig. 2.

The seat 10, as illustrated in Fig. 1, is preferably of the automotive type, being mounted upon a seat adjusting mechanism 11 comprising a left-hand track element 12 and a right-hand track element 13. Interjacent the track elements, the floor of the automobile is provided with a kick-up portion or tunnel 14 to provide clearance for the propeller housing. The tunnel along with a heater mounted below the seat, provided what appeared to be an insurmountable problem as it prevented the torsion bar and tie rods interconnecting the two track elements 12 and 13 from being straight elements, requiring portions thereof to be offset which thereby limited the amount of rotation which could be employed for controlling the operation of seat supporting mechanism. The mechanism, as provided on the track elements 12 and 13, is substantially the same except for being of the left and right hand.

The track element 13, as illustrated in Figs. 2 and 12, comprises a base support 15 of channel cross section having a web 16 with a central embossed wheel guide 17, and side flanges 18 which are deflected inwardly to provide guide members 19. An intermediate supporting member 21 has grooved wheels 22 mounted on opposite ends, apertures 23 and 24 being provided therein through which the wheel shafts 25 extend. The shafts also support wheels 26 on opposite sides of the wheels 22 in a position to be disposed below the guide flanges 19 of the base support 15 when the wheels 22 are guided on the wheel guide 17 thereof. The wheels 22 and 26 prevent vertical movement of the supporting member 21 relative to the base support 15 while permitting the member 21 to be longitudinally adjusted along the base support 15.

A seat support 27 is mounted above the intermediate support 21, being interconnected thereto by a vertical adjusting mechanism 28 at the front end and a similar vertical adjusting mechanism 29 at the rear end. The adjusting mechanism 28 at the front end embodies a sector link 31 having a plurality of notches 32 therein and being rigidly secured to a cross bar 33 which is journaled in an aperture 34 in the intermediate support 21. The sector link is secured to a link 35 by a pivot 36, the opposite end of the link being secured to the forward end of the seat support 27 by a pivot 37. A sector link 38, similar to the sector link 31, is rigidly secured to the tie bar 39 at the rear end of the seat support 27 which is journaled in an aperture 41 in the intermediate support 21. A pivot 42 directly connects the sector link 38 to the seat support 27.

A bell crank shaped latching element 43 is secured by a pivot 44 to the intermediate support 21 having a latching tongue 45 projecting outwardly thereof for engagement in a notch 32 of the sector link 31. An angle-shaped latching element 46 is pivoted to the intermediate supporting plate 21 by a pivot 47, having a similar latching tongue 48 which engages a notch 32 in the sector links 38. The intermediate support 21 has a tie bar 49 journaled in an aperture 51 therein and has rigidly secured thereon adjacent to the intermediate supports, a link 52 provided with slots 53 and 54. A rod 55 has one end secured in the slot 54 and the opposite end secured to the upper end 56 of the latching element 43. A rod 57 has one end secured in the slot 53 of the link 52 and the opposite end secured to the end 58 of the latching element 46. A hairpinlike spring 59 urges the adjacent ends of the rods 55 and 57 toward opposite ends of the slots 54 and 53, respectively, to retain them in pivotal relation with the end and provide a bias for urging the tongues of the latching elements into adjacent slots in the sectors.

The tie rod 49 extends upwardly adjacent one side of the seat at 61 and has an operating knob 62 on its upper end. When the knob 62 is pushed forwardly, the links 52 (Fig. 11) swing to the rear, moving the rods 55 along therewith while the rods 57 remain stationary since the slots 53 of links 52 move over the ends of the rods 57. Such movement of the rods 55 toward the rear releases the latching tongues 45 from slots 32 in the sectors 31, thus releasing rod 33 for rotation. Such rotation is produced, in a clockwise direction, when the occupant of the seat pushes rearwardly on the back thereof but such rotation is counter-clockwise when the weight of the occupant is moved forwardly on the seat. The presence of the link 35 permits the seat support 27 to pivot upwardly and downwardly on the pivot 42 at the rear of the support. After adjustment is made to vertically position the front edge of the seat, the movement of the knob 62 to vertical position moves the tongues 45 against the sector edges so that the springs 59 may force the latching tongues 45 into slots 32 when moved into aligned relation therewith, to retain the seat locked in adjusted position.

When the knob 62 is moved to the rear, the links 52 swing forwardly and the rods 57 are drawn forwardly therewith, while the ends of the rods 55 remain stationary as the slots 54 advance thereover. This movement of the rods 57 rotates the latching elements 46 clockwise for withdrawing the tongues 48 from notches 32 in the sector links 38 to thereby permit the rear end of the seat support 27 to be adjusted vertically. If the rear end is to be lowered, the weight of the occupant will produce the downward rotation of the seat support about the pivots 36 and 37 of the link 35. If the seat is to be raised, the weight of the occupant is moved forwardly to raise the rear end of the seat supporting mechanism, assisted by torsion springs 63 located about the tie rod 39. An extending arm 64 on one end of the spring is secured to the intermediate support 21 while the opposite end has an arm 65 extending through an aperture in a washer 66, which is clamped to the tie rod 39 by a set screw 67. A predetermined amount of torsion is provided to the springs 63 through the rotation of the washers 66 on the tie rod after which the washers are locked thereto by the set screws 67.

Attaching feet 68 are welded, riveted or otherwise secured to the bottom face of the base supports 16. The attaching feet may each be provided with an offset end 69 or may be otherwise shaped to conform to the shape of the floor of the automobile. Apertures 71 are provided in the feet 68 by which the feet may be bolted to the floor. A reinforcing bracket 72 has spaced portions 73 and 76 welded to the inner face of the intermediate supporting member 21, the portion 76 being disposed adjacent the front end of the member 21. The portions 73 and 76 are extended from the member 21 at substantially right angles, forming spaced ledge portions 74. A strip of material 77 is lanced out of the sheet of material from which the bracket is formed between the portions 73 and 76 and between the spaced ledge portions 74. The outer ends of the spaced ledge portions 74 are extended downwardly to provide a continuous flange 75 with the strip of material 77 extending directly upwardly from the flange 75 in a continuation thereof. The end of the strip 77 is sloped at 78 to mate with the sloping arm 79 of the supporting member 21, as illustrated in Fig. 4, to which it is welded so as to be maintained in reinforcing relation therewith. The latter arm is extended upwardly at 81 and provided with an aperture for receiving the end of a torsion bar 82.

Rearwardly of the strip 77 an arm 83 is lanced from the portion 73 and a portion of the ledge 74 and is extended upwardly and the pivot 44 secures the latching element 43 thereon. The intermediate support 21 is offset at 84 to have the portion rearwardly thereof disposed inwardly to provide clearance for the latching arm 46 disposed on the outside of the support 21. The downwardly extending flange 85 of the seat support 27 is extended outwardly at 86 and 87 to provide clearance at the outer side of the intermediate support 21 for the ends of the bars 33 and 39 extending therefrom. Upwardly extending bolts 88 are provided at the ends of the seat support 27, being welded, swaged or otherwise secured thereto, to which the seat is secured by nuts threaded onto the bolts.

The torsion bar 82 is provided near each end with an arm 89, the free ends of which arms are provided with pins 91, projecting between pairs of spaced flanges 92 on brackets 93 which are welded to flanges 18 of the base supports 16 as best illustrated in Figs. 4, 8, 10 and 12. As either intermediate support 21 is adjusted forwardly or rearwardly on its base support, the arms 89 and bar 82 insure simultaneous movement of both the intermediate supports. The pins 91 are permitted to rotate between the flanges 92 and to move upwardly and downwardly therebetween as will occur as the torsion bar 82 moves forwardly and rearwardly with the intermediate supporting member 21 and relative to the flanges 92.

It will be noted that the latching tongues 45 and 48 operate in arcuate slots 95 in the intermediate supports. The arcuate slots are limited in length to form stops for the tongues 45 and 48 which engage the lower ends thereof after releasing the sectors 31 and 38. The tongues act as stop elements for limiting the rotation of the sectors by engaging the extending end portions 96 thereof. A stamping 97 is welded to the rear portion of each of the intermediate supports 21 on the inner face thereof and flanged inwardly and downwardly to form a support for the adjacent inner ends of the shaft 25 on which the rear wheels 22 and 26 are supported at the rear end of the intermediate supporting member 21. The flange 75 supports the inner end of the shaft 25 at the front of the intermediate supporting member.

A latching mechanism for retaining the intermediate supports in adjusted position on the base supports 13 embodies an operating element 98 consisting of a rod which is pivoted in a bracket 100 (see Fig. 4) that is welded to the upwardly extending flange 77 of the reinforcing bracket 72 and the rod is shaped into a crank 99 and has a latching detent 101 at the rear end. A bracket 102 is welded to the intermediate support 21 having a flange 103 containing a notch 104 which forms a bearing for the operating element 98 at the inner end. A spring 105 is secured to a flange 106 on the bracket 102, the opposite end being secured to the crank 99 of the operating element 98. The guide members 19 of the base supports 15 are provided with a plurality of notches 108 into which the detent 101 on the operating element 98 may extend. On the left hand track element an angle shaped locking pawl 109 is secured by a pivot 111 to a bracket 112 which may be a separate element welded to the intermediate support or which may be a portion of the intermediate support struck outwardly therefrom as illustrated. The locking pawl 109 has a slot engaging end 113 which projects within a notch 108 on the left hand track element as illustrated in Fig. 5. It will be noted that the support for the latching mechanism between the intermediate support and the base support is the main difference between the track elements at the right and left hand sides of the seat support.

A rod 115 interconnects the crank 99 with the upper end of the lever 109 so that the right and left hand track elements are latched and unlatched simultaneously. In view of the presence of the torsion bar 82 the intermediate supports are always maintained in the same relationship with their respective base supports. A slotted tongue 116 is struck from the intermediate portion of the left hand track element in which the latching end 113 of the lever 109 is guided. Simultaneously, the flange 106 of the bracket 102 is provided with a slot 117 in which the end 101 of the operating element 98 is accurately guided, as illustrated in Fig. 7. It will be noted that washers 118 and cotter keys 119 are utilized for anchoring the ends of the torsion bar 82 in the brackets 79 and similar washers and cotter keys are employed for anchoring the ends of the latch operating rods 55 and 57 to the respective latches.

It will be noted further, that when necessary, the tie rods 33 and 39, the torsion rod 82, the latch release lever 49 and the rod 115 may be offset upwardly at 121 for the purpose of providing clearance for the tunnel 14 extending upwardly from the floor of the automobile. When the seat 10 is secured to the track elements 11 and 12 adjustment forwardly and rearwardly is permitted when the lever 98 is manipulated to release the latching ends 101 and 113 from the respective slots 108. After the seat is adjusted longitudinally of the automobile on the rollers 22, the release of the operating element 98 permits the springs 105 and 114 to move the latching ends 101 and 113 into a notch 108, or against the flange 107 if not aligned with the notch 108, so that a slight forward or rearward movement of the seat will permit each of the latching ends to move into an adjacent notch. When it is desired to adjust the seat vertically, the tie bar 49 is rotated forwardly or rearwardly, depending upon whether the front or rear end of the seat, or both, are to be adjusted. When rotated downwardly, the tongue 45 moves out of a notch 32, permitting the sector link 31 to be rotated either clockwise or counter-clockwise depending upon the forward or rearward position of the body to cause the seat support 27 to be moved upwardly or downwardly at the front end. After adjustment, the return of the tie rod 49 to vertical position permits the latch 45 to move into a notch 32 and thereby lock the front end of the seat in adjusted position. If the rear end of the seat is to be adjusted vertically, the tie rod 49 is rotated to the rear, thereby moving the latching tongue 48 from a notch 32 in the sector link 38. The rear end of the seat is raised by moving the body forwardly permitting the tension of the springs 63 to assist in the raising of the rear end of the seat support 27, which pivots about the link 35 and pivots 36 and 37 at the forward end of the seat support. If the seat is to be lowered, the weight of the occupant is moved to the rear causing the sector to rotate clockwise and after an adjustment is made the portion 61 of the tie rod 49 is again returned to vertical position, permitting the latching tongue 45 to move into a notch 32 of the sector link 38 and thereby retain the rear end of the seat in vertical adjusted position. It is to be understood that while separate tie rods 49 could be employed for actuating the latching tongues 45 and 48, satisfactory latch control is obtained by the single tie rod 49 as above described.

What is claimed is:

1. A track element for supporting a seat including, in combination, a base support, an intermediate support disposed parallel thereto, means interconnecting said supports to permit relative longitudinal movement therebetween, a seat support disposed substantially parallel to said base and intermediate supports, a link formed as a sector pivoted at spaced points thereon to said seat support and to said intermediate support near one end of each thereof, a second link formed as a sector, a third link pivoted to said second link, said second and third links being pivoted to said intermediate support and seat support respectively near the other ends thereof at points spaced from their common pivot, said first and second links being rotatable independently of each other.

2. A track element for supporting a seat including, in combination, a base support, an intermediate support disposed parallel thereto, means interconnecting said supports to permit relative longitudinal movement therebetween, a seat support disposed substantially parallel to said base and intermediate supports, a link pivoted at spaced points thereon to said seat support and to said intermediate support near one end of each thereof, a second link, a third link pivoted to said second link, said second and third links being pivoted to said intermediate support and seat support respectively at points spaced from their common pivot joining said second and third links said first and second links, being swingable independently of each other for adjusting either end of the seat support substantially vertically, one of said pivots of said first and second links being movable to positions above and below a horizontal plane through the other pivot of that link whereby said seat support may move to positions substantially vertically displaced when the links are rotated approximately 90°.

3. A track element for supporting a seat including, in combination, a base support, an intermediate support disposed parallel thereto, means interconnecting said supports to permit relative longitudinal movement therebetween, a seat support disposed substantially parallel to said base and intermediate supports, a link formed as a sector pivoted at spaced points thereon to said seat support and to said intermediate support near one end of each thereof, a second link formed as a sector, a third link pivoted to said second link, said second and third links being pivoted to said intermediate support and seat support respectively, near the other ends thereof at points spaced from their common pivot, each of said sectors being rotatable independently of the other for independently adjusting either end of the seat support vertically, said links having notches arcuately disposed about one pivot thereof, and latch means having pivots fixed in relation to said last pivots and movable into and out of engagement with said notches.

4. In combination with a pair of supporting members one disposed above the other, a pair of independently swingable links, means for pivoting one end of each link to one member, means for directly pivoting the other end of one link to the other member, means providing a lost motion connection between the other end of the other link and said other member, one pivot of each link being located below the other when the supporting members are in the most adjacent position and swingable about said other pivot to a position above said other pivot for increasing the spacing of said members, and independent retaining means engageable with each said link by which it is secured in angularly adjusted position.

5. In combination with a pair of supporting members one disposed above the other, a pair of independently swingable links, means for pivoting one end of each link to one member, means for directly pivoting the other end of one link to the other member, means providing a lost motion connection between the other end of the other link and said other member, one pivot of each link being located below the other when the supporting members are in the most adjacent position and swingable about said other pivot to a position above said other pivot for increasing the spacing of said members, independent retaining means engageable with each of said links by which it is secured in angularly adjusted position, a track element joined to one of said members in a manner to permit relative longitudinal movement between the element and member, and locking means on said track element and last said member for retaining the element and member in adjusted position.

6. In combination with a pair of supporting members one disposed above the other, a pair of independently swingable links, means for pivoting one end of each link to one member, means for directly pivoting the other end of one link to the other member, means providing a lost motion connection between the other end of the other link and said other member for permitting the longitudinal movement of said other member when the directly connected link is angularly adjusted and the angular adjustment of said link having the lost motion connection relative to said other member when said other member is retained against such longitudinal movement by said directly connected link, and independent retaining means engageable with each said link by which it is secured in angularly adjusted position, said links being disposed with their pivoting means substantially horizontally aligned in a medial postion and being pivotal to positions substantially 45° above and below said medial position.

7. In combination with a pair of supporting members one disposed above the other, a pair of independently swingable links, means for pivoting one end of each link to one member, means for directly pivoting the other end of one link to the other member, means providing a lost motion connection between the other end of the other link and said other member for permitting the longitudinal movement of said other member when the directly connected link is angularly adjusted and the angular adjustment of said link having the lost motion connection relative to said other member when said other member is retained against such longitudinal movement by said directly connected link, independent retaining means engageable with each said link by which it is secured in angularly adjusted position, said links being disposed with their pivoting means substantially horizontally aligned in a medial position and being pivotal to positions substantially 45° above and below said medial position, and stop means for limting said movement to substantially 90°.

8. Right and left-hand carrying element for a seat, each said element embodying a pair of supporting members one disposed above the other, a pair of links for each element, a pair of tie rods extending between said elements and pivotally supported by one of said members of each element, one part of each link being rigidly secured to an end of a tie rod, a pivot securing another part of each link of one tie rod to the other member of each element, means providing a lost motion connection between another part of each link of the other tie rod and the said other member of each element, said means including a pivot on each said links of said other tie rod, each said tie rod having an offset portion therein which is disposed substantially vertically when said pivots on the links secured to said tie rods and said tie rods at their points of pivoting are in substantially horizontally aligned relation.

9. Right and left-hand carrying elements for a seat, each said element embodying a pair of supporting members one disposed above the other, independently swingable front and rear links for each element, a pair of tie rods extending between said elements and pivotally supported by one of said members of each element, one part of each link being rigidly secured to an end of a tie rod, a pivot directly securing another part of each link of one tie rod to the other member of each element, means providing a lost motion connection between another part of each link of the other tie rod and said other member of each element, said means including a pivot on each said link of said other tie rod, said tie rods causing said links to move in unison on the right and left-hand elements and each tie rod having an offset portion therein disposed substantially vertically when said links are in a medial position relative to an arc through which the links are swingable.

10. Right and left-hand carrying elements for a seat, each said element embodying a pair of supporting members one disposed above the other, front and rear links for each element, a pair of tie rods extending between said elements and pivotally supported by one of said members of each element, one part of each link being rigidly secured to an end of a tie rod, a pivot directly securing another part of each link of one tie rod to the other member of each element, means providing a lost motion connection between other parts of the links secured to the other tie rod and the other member of each element which permits either link to be operated independently of the other, each said tie rod causing the links which are rigidly secured thereto to move in unison on the right and left-hand elements, and a torsion spring about at least one of said tie rods for supporting a portion of the load on said other member.

11. A pair of spaced seat carrying elements, each element including a pair of supporting members one of which is adjustable vertically relative to the other, independently swingable front and rear links for each element, a pair of tie rods extending between the elements and pivoted to one of said members of each element and rigidly connected at each end to one of the links, pivots for directly connecting a link of each element to the other member thereof, means providing a pivotal lost motion connection between the other of said links of each element and the other member thereof, said means including a pivot on each said other link, one pivot of each said link of said elements being located below the other pivot thereof in the lower adjusted position of said members and being in a position above said other pivot in the higher adjusted position of said members.

12. A pair of spaced seat carrying elements, each element including a pair of supporting members one of which is adjustable vertically relative to the other, a pair of independently swing links for each element, pivots connecting the links of each element to one of said members thereof, pivots for directly connecting a link of each element to the other member thereof, means providing a pivotal lost motion connection between the other of said links of each element and the other member thereof, said means including a pivot on each said other link, one pivot of each link of said elements being located below the other pivot thereof in the lower adjusted position of said members and being in a position above said other pivot in the higher adjusted position of said members, certain of said pivots being rods extending between said elements and rigidly secured to said links, said rods having an offset portion therein disposed at an angle of substantially 90° from a line joining the said two link pivots.

13. A carrying element for a seat including, in combination, a pair of members one of which is adjustable vertically relative to the other, a pair of independently adjustable links, pivots securing said links to one of said members, a pivot for directly pivoting one of said links to said other member, a third link pivoted to said other link of said pair and to said other member to permit independent swinging of said links, one pivot of each of said first and second links being located below the pivot thereof about which the links swing in the lower adjusted position of said members and being in a position above the pivot thereof about which the links swing in the higher adjusted position of said members.

14. In combination with a pair of supporting members of a seat carrying element to be relatively adjusted vertically, a pair of links pivotally connected to one of said members at opposite ends thereof, means directly pivoting one of said links to said other member, means providing a pivotal lost motion connection between the other link and said other member to permit independent swinging of said links, the pivot means of each link connected to the other member being located below the pivots on the links about which the links swing when said other member is in the lower adjusted position and being located thereabove when said other member is moved to the highest adjusted position thereof.

15. A pair of spaced seat carrying elements, each element including a seat supporting member and a second member in alignment therewith, a link pivoted to one member of each element, a tie rod pivoted to the second said member of each element and rigidly secured to each said link at points spaced from the pivots thereof, said tie rod being offset upwardly between said elements with the offset portion disposed substantially 90° from the plane through the pivots of the links and the tie rods.

ALFRED H. HABERSTUMP.

REFERENCES CITED

The following references are of record in the file of this patent:

UNITED STATES PATENTS

| Number | Name | Date |
|---|---|---|
| 870,692 | Shepard | Nov. 12, 1907 |
| 1,342,389 | Kuntz | June 1, 1920 |
| 1,448,261 | Custer | Mar. 13, 1923 |
| 1,957,785 | Knapp | May 8, 1934 |
| 2,132,009 | Ball | Oct. 4, 1938 |
| 2,149,945 | Whedon et al. | Mar. 7, 1939 |
| 2,149,946 | Whedon et al. | Mar. 7, 1939 |
| 2,170,923 | Jacobs | Aug. 29, 1939 |
| 2,195,507 | Best | Apr. 2, 1940 |
| 2,202,113 | Miller | May 28, 1940 |
| 2,219,456 | Saunders et al. | Oct. 29, 1940 |
| 2,227,764 | Saunders et al. | Jan. 7, 1941 |
| 2,235,237 | Saunders et al. | Mar. 18, 1941 |
| 2,429,017 | De Rose | Oct. 14, 1947 |

FOREIGN PATENTS

| Number | Country | Date |
|---|---|---|
| 534,781 | Great Britain | Mar. 18, 1941 |
| 551,808 | Great Britain | Mar. 10, 1943 |
| 587,920 | Great Britain | May 8, 1947 |